Patented Mar. 4, 1930

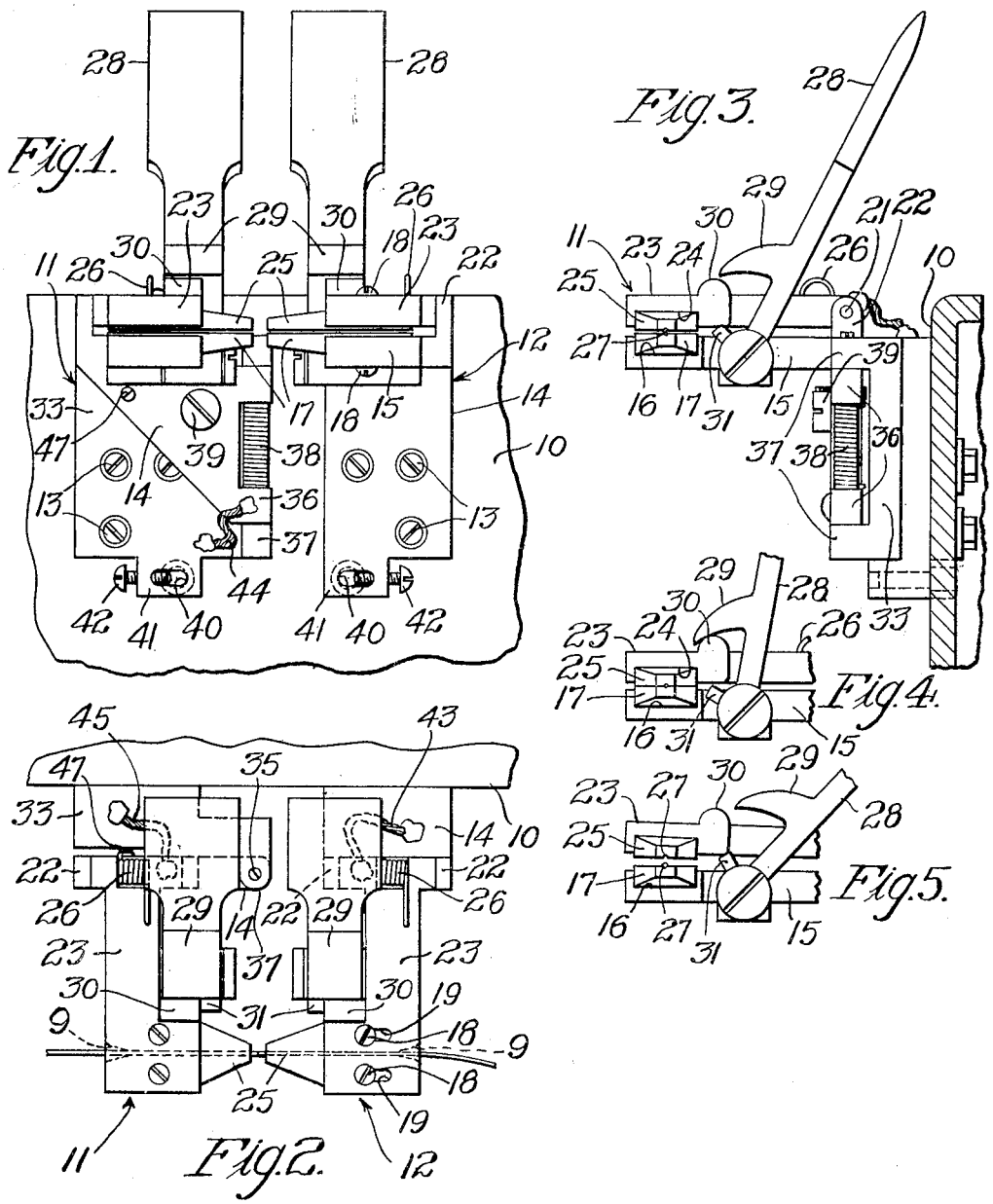

1,749,006

UNITED STATES PATENT OFFICE

BRUNO MAX ALFRED TREBES, OF OAK PARK, ILLINOIS, ASSIGNOR TO WESTERN ELECTRIC COMPANY, INCORPORATED, OF NEW YORK, N. Y., A CORPORATION OF NEW YORK

CLAMPING DEVICE

Application filed June 20, 1923. Serial No. 646,729.

This invention relates to improvements in clamping devices and more particularly to such a device which may be included in an electrical circuit and conduct current to an article or articles held by the device.

An object of the invention is to provide a clamp of this type that is adapted to firmly hold articles of small cross section and which may be readily and quickly operated to clamp or release the article.

Another object of the invention is to provide a clamp of such design that an article may be readily inserted therein when the clamp is in an open position, the article being automatically adjusted into a predetermined position when the clamp is closed.

Clamping devices made in accordance with the invention may be used to advantage with brazing apparatus for splicing wire, but it is to be understood that they may be used for a variety of other purposes without departing from the spirit and scope of the invention. When used in brazing apparatus the clamps are preferably employed in pairs and one or both of the clamps constituting the pair are provided with means for exerting pressure on the abutting ends of the wires during the brazing operation.

Other objects and advantages of the invention will more fully appear from the following detailed description.

In the accompanying drawings, which illustrate the improved form of clamping device as applied to a brazing machine, Fig. 1 is a fragmentary front elevation of a brazing machine with a pair of the improved clamping devices applied thereto;

Fig. 2 is a top plan view of the apparatus shown in Fig. 1;

Fig. 3 is a side elevation of one of the clamping devices showing the clamping jaws in loading position;

Figs. 4 and 5 are fragmentary side elevations of the clamping jaws showing them in clamping and open positions respectively.

Referring now to the drawings in detail in which like reference numerals designate similar parts throughout the several views, 10 indicates the side wall of a brazing apparatus to which two improved clamping devices 11 and 12 are attached by means of screws 13.

The clamping device 12 comprises an L-shaped supporting member the vertical leg 14 of which is provided with openings to receive the screws 13. The outer end of the horizontal leg 15 of the L-shaped member is provided with a transverse slot 16 within which a gripping member 17 is adjustably mounted by means of screws 18 projecting through slots 19 in the leg 15 and threaded in the gripping member 17. The horizontal leg 15 constitutes one jaw member of the clamping devices. Pivotally mounted upon a stud 21 supported in parallel ears 22 integral with the horizontal leg 15 is a jaw member 23 the outer end of which is provided with a slot 24 within which a gripping member 25 similar to the gripping member 17 is adjustably mounted. A coil spring 26 mounted on the stud 21 and having its ends in engagement with the upper surfaces of the leg 15 and jaw member 23 serves to normally hold the jaw member 23 in such position that the gripping members 17 and 25 are disposed in light contact with each other. The clamping device shown is designed particularly for clamping fine wire and conducting current thereto during a welding operation, and for this reason the adjacent surfaces of the gripping members 17 and 25 are provided with cooperating V-shaped grooves 27 to receive the wire. The entrance ends of the cooperating grooves 27 are funnel shaped as indicated at 9 in Fig. 2 to facilitate entering the wires therein. When the gripping members 17 and 25 are in light contact, as shown in Fig. 3, the wire to be brazed may be readily inserted therein and guided into its approximately predetermined position by the grooves 27, the slight pressure exerted by the spring 26 serving to hold the wire in place. To clamp the wire, a handle 28 is moved counter-clockwise, as viewed in Fig. 3. The handle 28 is pivoted at its lower end to a horizontal stud carried by the leg 15. Integral with the handle 28 is a projection 29 having a cam shaped lower surface which engages a boss 30 formed on the upper surface of the clamping jaw 23, and when the said handle is moved counter-clockwise, the cam action between the projection 29 and the boss 30 serves to force the gripping members 17 and 25 toward each other and clamp the wire between them. As the gripping members 17 and 25 are moved toward each other by the handle 28, the slots 27 in the gripping members will adjust the wire accurately therein. To remove the wire from the clamping device, the handle 28 is moved clockwise, as viewed in Fig. 3, until a lug 31 of the handle engages a lateral extension on the jaw member 23 and lifts it against the action of the spring 26, as shown in Fig. 5.

The clamping device 11 is similar to clamping device 12, just described, except that the vertical leg 14 of the supporting member is hinged to a plate 33 which is secured to the brazing apparatus by the screws 13. The hinged connection comprises a stud 35 mounted in parallel ears 36 integral with the vertical leg 14, the ends of the stud being supported in parallel ears 37 integral with the plate 33. A coil spring 38 suitably mounted on the stud 35 and having its ends in engagement with the outer faces of the plate 33 and vertical leg 14 respectively serves to hold the said vertical leg 14 normally spaced from the plate 33, a distance determined by the head of a screw 39 fitting through an opening in the vertical leg 14, and threaded into the plate 33.

When the clamps 11 and 12 are used with brazing apparatus they are mounted thereon as shown in Fig. 1, wherein the ends of the pairs of gripping members 17 and 25 are spaced a short distance apart. The gripping members 17 and 25 are adjustably mounted in the horizontal leg 15 of the brazing device 12 to accommodate different sizes of wire. A heavy wire requires a greater space between the gripping members than a fine wire. The distance will be correctly adjusted when the wire next to the finished splice does not look scorched but discolored only. An operator with a little experience can judge accurately the correct space to allow between the two pairs of gripping members 17 and 25 for different sizes of wire to arrive at the best results.

The adjacent ends of the gripping members 17 and 25 are tapered in all directions as shown in the drawings for convenience in viewing the brazing operation.

The clamping device 12 is connected to one side of an electrical circuit by means of a wire (not shown) the end of which is fitted within an opening 40 formed in a projection 41 integral with the vertical leg 14, good electrical contact being secured between the wire and said vertical leg by means of a screw 42 which clamps the wire between it and the sides of the opening 40. A low resistance contact between the vertical leg 14 and the jaw member 25 is secured by a wire 43 soldered at each end to the upper surface of the clamping member 23 and the upper surface of the vertical leg 14 as shown in Fig. 2. Clamping device 11 is connected to the other side of the electrical circuit by means of a wire (not shown) attached to the plate 33 by a fastening like that with which the vertical leg 14 of clamping device 12 is provided. Good electrical contact is had between the plate 33 and the vertical leg 14 by means of a wire 44 soldered at its ends to the outer surfaces of the plate 33 and vertical leg 14, while a low resistance contact between the clamping member 23 and the plate 33 is afforded by means of a wire 45 having its ends soldered to the upper edge of the plate 33 and upper surface of the clamping jaw 23.

The end of one of the wires to be brazed is placed between the gripping members 17 and 25 of clamping device 11 so that the end of the wire projects a short distance beyond the ends of the clamping device, as shown in Fig. 2, while the handle 28 is in the position shown in Fig. 3. The said handle is then moved counter-clockwise to grip the wire and adjust it accurately within the grooves 27 in the clamping members. The handle 28 associated with clamping device 12 is moved to the position shown in Fig. 3 and the end of the other wire to be brazed is inserted between the gripping members, the grooves 27 guiding the end of the wire accurately until it abuts the end of the wire projecting beyond the end of the gripping members 17 and 25 associated with the clamping device 11.

After the ends of the two wires are in engagement the operator pushes upon the wire within the clamping device 12 until the vertical leg 14 of clamping device 11 is moved clockwise a distance sufficient to bring an adjustable stop screw 47 in contact with the outer face of the plate 33. The handle associated with clamping device 12 is then moved counter-clockwise, as viewed in Fig. 3, to firmly clamp the wire in position. The torsion of coil spring 38 which tends to swing the vertical leg 14 and clamping jaws carried thereby in a counter-clockwise direction, as viewed in Fig. 2, serves to hold the abutting ends of the wires in contact under slight pressure, which is essential to secure a rapid and satisfactory spliced joint between the wires by brazing. After the wires have been adjusted as above described, electrical current is supplied the clamping devices 11 and 12, causing the portion of the wire between the gripping members 17 and 25 associated with the said clamping devices to become heated to a red heat, at which time silver solder or other suitable material is used to effect a brazed joint between the said abutting ends. After the joint has been made, the current is turned off, and the handles 28 associated with the clamping devices 11 and 12 are moved clockwise, as viewed in Fig. 3, a distance sufficient to widely separate the gripping members associated with each clamping device, as shown in Fig. 5, to permit the brazed wires to be moved frontward out of the said clamping devices.

What is claimed is:

The combination with an apparatus for electrically brazing articles, of a pair of clamping devices each comprising a pair of jaw members, one of which is pivotally mounted with respect to the other, means for resiliently urging the pivoted clamping device about its pivot and toward the other clamping device to exert a pressure upon the abutting ends of the articles to be brazed, and a lever pivoted on one of the jaw members of each clamping device, said lever having a plurality of cam surfaces which engage the other jaw member to move it between its open and closed positions and to selectively lock it in such positions.

In witness whereof, I hereunto subscribe my name this 9th day of June, A. D. 1923.

BRUNO MAX ALFRED TREBES.